US009000923B2

(12) United States Patent
Benedict

(10) Patent No.: US 9,000,923 B2
(45) Date of Patent: Apr. 7, 2015

(54) READER AND METHOD FOR WHEEL-BASED RFID DEVICES

(75) Inventor: Robert Leon Benedict, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 1883 days.

(21) Appl. No.: 12/172,316

(22) Filed: Jul. 14, 2008

(65) Prior Publication Data

US 2010/0007465 A1 Jan. 14, 2010

(51) Int. Cl.
*G08B 13/14* (2006.01)
*G06K 7/10* (2006.01)
*B60C 23/04* (2006.01)
*H04Q 5/22* (2006.01)
*B60C 23/00* (2006.01)

(52) U.S. Cl.
CPC .......... *G06K 7/10346* (2013.01); *B60C 23/007* (2013.01); *B60C 23/009* (2013.01); *B60C 23/0408* (2013.01); *G06K 7/10316* (2013.01)

(58) Field of Classification Search
USPC ........................................ 340/10.1; 73/146.5
See application file for complete search history.

(56) References Cited

U.S. PATENT DOCUMENTS 4,067,235 A 1/1978 Markland et al. ............ 73/146.5
2002/0075145 A1* 6/2002 Hardman et al. ............. 340/442
2005/0110627 A1* 5/2005 Sabet et al. ................... 340/447
2007/0018805 A1* 1/2007 Dixon et al. .................. 340/447

FOREIGN PATENT DOCUMENTS

WO 2005/036694 A2 4/2005
WO 2005/072993 A1 8/2005 ............. B60C 23/04

OTHER PUBLICATIONS

European Search Report completed Oct. 12, 2009.

* cited by examiner

*Primary Examiner* — Jack K Wang
(74) *Attorney, Agent, or Firm* — Richard B. O'Planick

(57) ABSTRACT

A drive over, reader system for a wheel-based, electric field-actuated transponder device includes a vehicle support pad surface; an antenna device on the support pad located to operatively align with a wheel-based transponder device of the vehicle with the vehicle positioned on the pad in a read location; a transmitter device and a receiver device coupled to the antenna device for generating an upwardly directed electric field to actuate the transponder device and receive a responsive signal back from the transponder device. The upwardly directed electric field operatively engages the transponder device as the vehicle drives over the antenna device. Multiple antennae may be aligned in a linear array to subject the transponder device to multiple electric fields as the vehicle traverses the support pad. The antenna device of the reader system may be configured as a layered panel positioned on the support pad or as a dipole antenna embedded within the support pad.

18 Claims, 10 Drawing Sheets

READER AND METHOD FOR WHEEL-BASED RFID DEVICES

FIELD OF THE INVENTION

The invention relates generally to a reader for a radio frequency identification transponder and, more specifically, to a transponder reader for wheel-based RFID devices.

BACKGROUND OF THE INVENTION

In commercial trucking the tires on a trailer are the highest cost item in the operation of such trailers due to theft, damage, and normal replacement. It is common within the commercial trucking industry for trailers to be either leased by a trailer leasing entity to a trucking company pulling the trailers, or owned directly by the trucking company. In either case, it is important that the tires on each trailer be effectively and efficiently identified and monitored in order to minimize operational costs associated with their use. In addition, it is desirable to identify and monitor the tires on commercial transport vehicles in a cost effective and timely manner in order to maintain control over the identity of the actual tires in use.

SUMMARY OF THE INVENTION

In one aspect of the invention, a reader system for a wheel-based, electric field-actuated RFID tag or transponder device is provided including: a support pad for operatively supporting and positioning a vehicle in at least one read location on an upper pad surface; one or more antenna device(s) on the support pad located to operatively align with a wheel-based transponder device of the vehicle with the vehicle positioned on the pad in the read location; one or more transmitter device(s) and receiver device(s) coupled to the antenna device(s) for generating an upwardly directed electric field(s) to actuate the transponder device and receive a responsive signal back from the transponder device. The upwardly directed electric field(s) operatively couple with the RFID tag or transponder device as the vehicle drives over the antenna device.

According to another aspect, the antenna device may be configured as one or more dipole antenna(s) either coupled to a common transmitter and receiver device or to respective multiple transmitter and receiver devices. The dipole antenna(s) may be partially or entirely embedded within the support pad and may include a reflective member positioned below to direct electric field energy upward from the dipole antenna(s).

In yet another aspect, the antenna device may be configured as a generally in-line array of antennae coupled to one or multiple electric field generators, the array aligning with the wheel-based transponder device(s) of the vehicle to operatively direct a plurality of generally in-line electric fields upward toward the wheel unit RFID tag(s) as the vehicle moves over the in-line array. The RFID tags or transponder device(s) may be rim or tire mounted to rotate with the wheel unit. The in-line array of antennae have a spacing operative to proximally couple with the RFID tags as the wheel unit(s) roll across the pad One or more secondary above-ground antenna device(s) may be employed in a further aspect of the invention, each coupled to an electric field generating transmitter device and located to operatively subject the vehicle wheel-mounted transponder device to a secondary electric field with the vehicle in a read location on the pad.

The antenna device of the reader system may be configured to include: a base layer; a conductive antenna member positioned on the base layer; and a cover layer over the antenna member. The antenna member may be configured to include conductive top and bottom plates and a dielectric material layer situated between the top and bottom plates, and, according to an aspect of the invention, the cover layer and the base layer may be composed of respective materials having a respective relative static permittivity less than the relative static permittivity of the dielectric material layer. The electric field from the antenna member is thereby configured to extend upward toward the wheel-based transponder.

DEFINITIONS

"Aspect Ratio" means the ratio of a tire's section height to its section width.

"Axial" and "axially" mean the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chaffers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Circumferential" means lines or directions extending along the perimeter of the surface of the annular tread perpendicular to the axial direction.

"Carcass" means the tire structure apart from the belt structure, tread, undertread, over the plies, but including beads, if used, on any alternative rim attachment.

"Casing" means the carcass, belt structure, beads, sidewalls and all other components of the tire excepting the tread and undertread.

"Chaffers" refers to narrow strips of material placed around the outside of the bead to protect cord plies from the rim, distribute flexing above the rim.

"Cord" means one of the reinforcement strands of which the plies in the tire are comprised.

"Equatorial Plane (EP)" means the plane perpendicular to the tire's axis of rotation and passing through the center of its tread.

"Footprint" means the contact patch or area of contact of the tire tread with a flat surface at zero speed and under normal load and pressure.

"Innerliner" means the layer or layers of elastomer or other material that form the inside surface of a tubeless tire and that contain the inflating fluid within the tire.

"Normal Inflation Pressure" means the specific design inflation pressure and load assigned by the appropriate standards organization for the service condition for the tire.

"Normal Load" means the specific design inflation pressure and load assigned by the appropriate standards organization for the service condition for the tire.

"Placement" means positioning a cord on a surface by means of applying pressure to adhere the cord at the location of placement along the desired ply path.

"Ply" means a layer of rubber-coated parallel cords.

"Radial" and "radially" mean directed toward or away from the axis of rotation of the tire.

"Radial Ply Tire" means a belted or circumferentially restricted pneumatic tire in which at least one ply has cords which extend from bead to bead and are laid at cord angles between 65° and 90° with respect to the equatorial plane of the tire.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tread Width" means the arc length of the tread surface in the axial direction, that is, in a plane parallel to the axis of rotation of the tire.

"Winding" means a wrapping of a cord under tension onto a convex surface along a linear path.

BRIEF DESCRIPTION OF THE DRAWINGS

The invention will be described by way of example and with reference to the accompanying drawings in which.

DETAILED DESCRIPTION OF THE INVENTION

Figure 1:
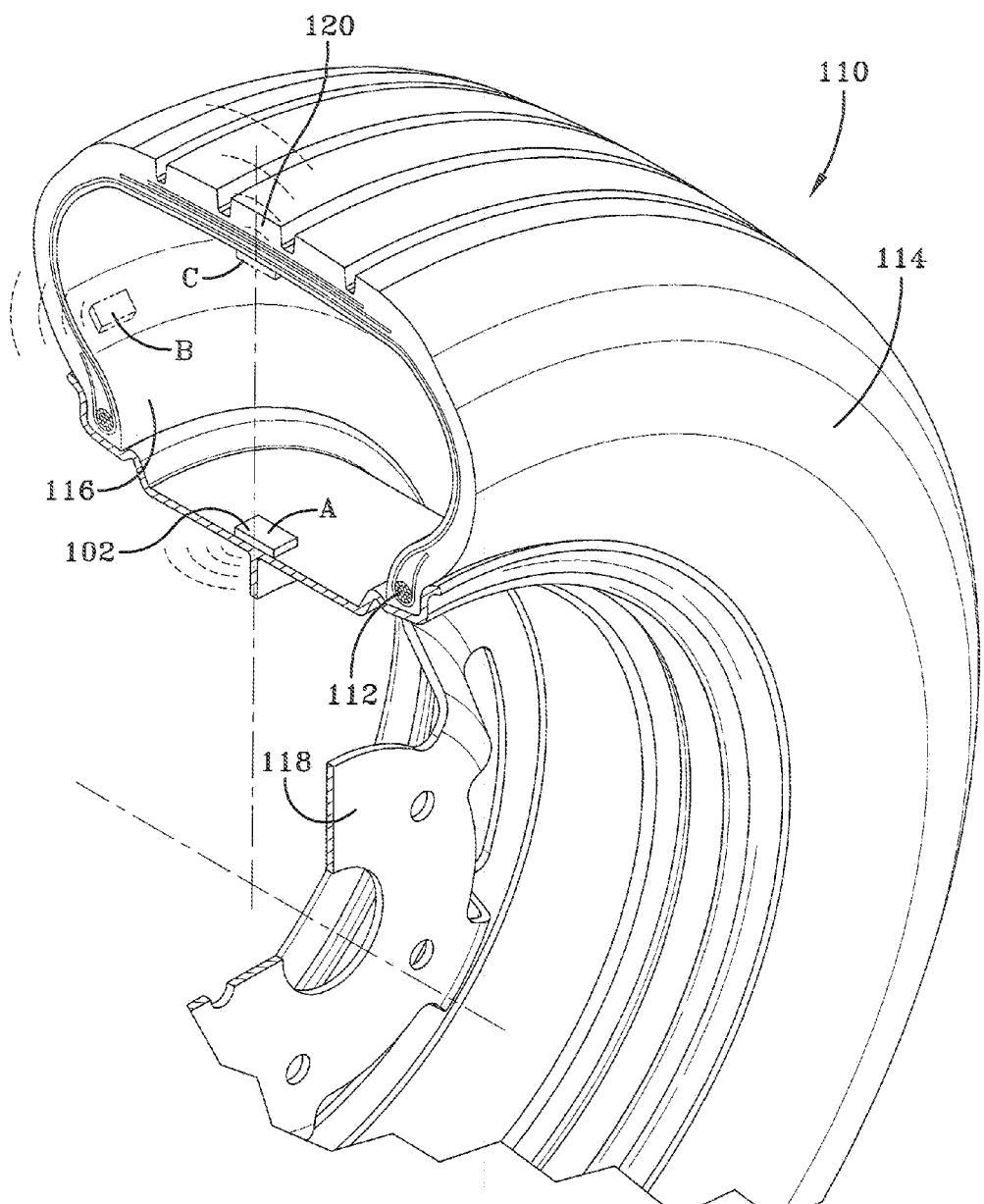
FIG. 1 is a partially sectioned perspective view of a wheel unit showing a transponder in alternative mounted locations.
Figure 4:
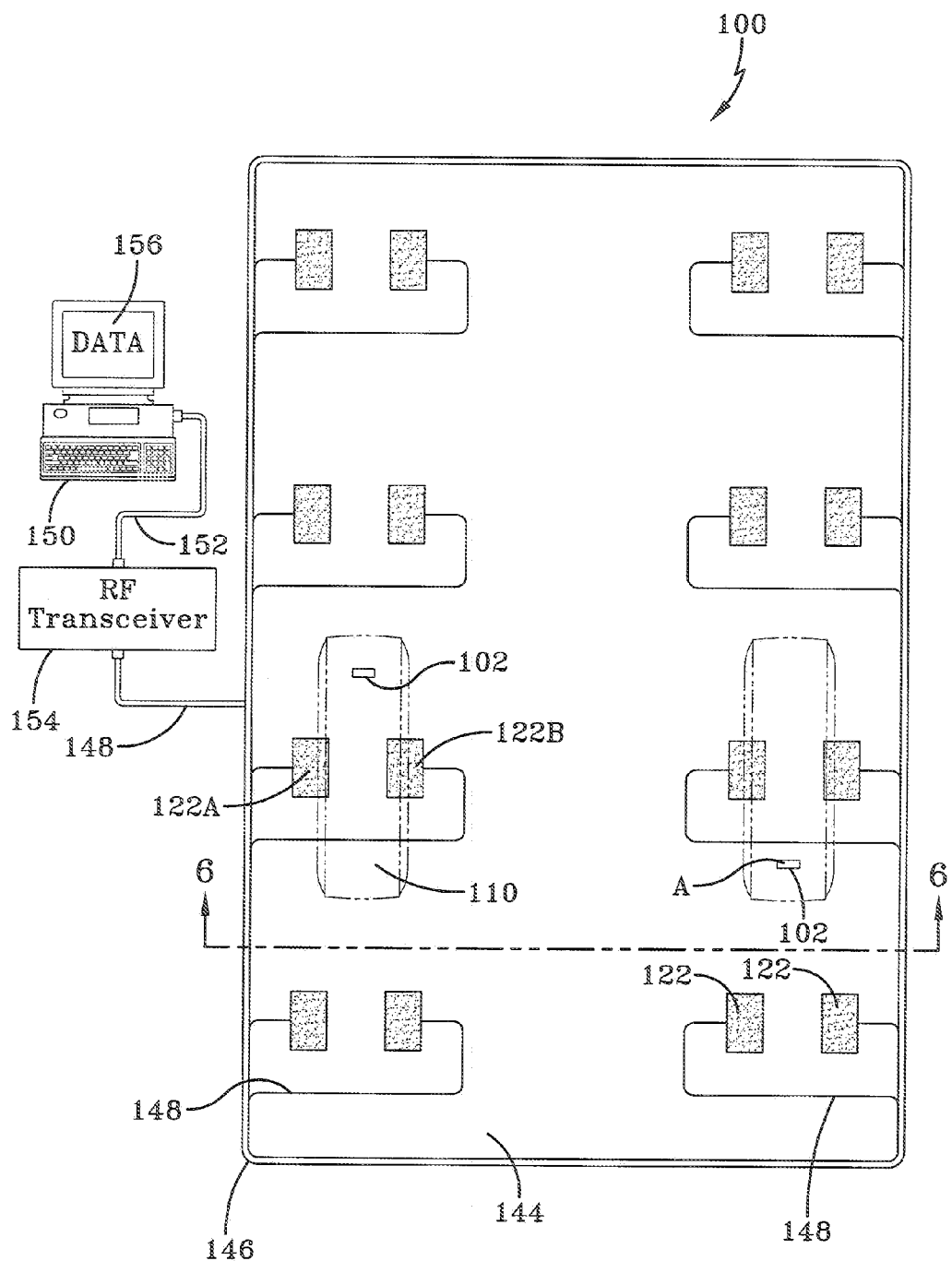
FIG. 4 is a schematic view of a reader system configured pursuant to the invention.

With reference to FIGS. 1 and 4, a drive-over reader system 100 for a vehicle having one or more wheel mounted transponder devices 102 is shown. As used herein, "transponder device" is used in its broad connotation and includes devices such as RFID tags and other devices for data storage and transmission. The reader system 100 is located within a read station 100 through which the vehicle is preferably, although not necessarily, is driven during a tag-reading operation. The vehicle transponder device(s) 102 may be mounted to a wheel unit 110 in a number of locations, such as those identified in FIGS. 1 and 4 as locations A, B, C. The wheel unit 110 includes a tire of conventional construction having a pair of beads 112, a tire carcass 114 extending between the beads 112, a tire crown region 120, and a tire inner liner 116. The tire is mounted to a wheel rim 118 in conventional fashion. One or more wheel units 110 of a vehicle may be provided with one or more transponder devices 102.

Alternative locations for a transponder device in a respective wheel unit 110 may be utilized such as at locations A, B, and C. In addition, other mounting locations may be utilized within the wheel unit 110 to suit the needs and system requirements of the user without departing from the invention. Location A mounts the transponder device to center surface of the wheel rim 118 as shown. Alternative location B locates the transponder against a sidewall portion of the inner liner 116 of the tire while location C positions the transponder against a crown portion of the inner liner 116. While only one transponder device is generally used per wheel unit, multiple transponder devices may be deployed and utilized within a single wheel unit if desired. For example, a transponder device may be positioned at all three locations A, B, and C if desired. The transponder device is of a type common within the industry combining data storage and transmission capability initiated by receipt of RF signal. Upon activation, the transponder transmits an RF data stream to a remote RF receiver. The stored data may include pertinent information that a user would find beneficial to monitor in the operation of a vehicle or a commercial fleet, such as an identification of the vehicle, the tire, the wheel unit, and/or the cargo conveyed by the vehicle and its destination. The RF transponder may be read-only or may include read-write capability.

Figure 2:
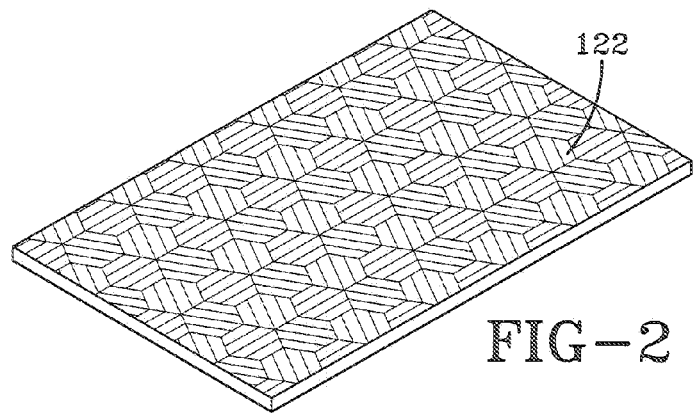
FIG. 2 is a front perspective view of an antenna device configured pursuant to the invention.
Figure 3:
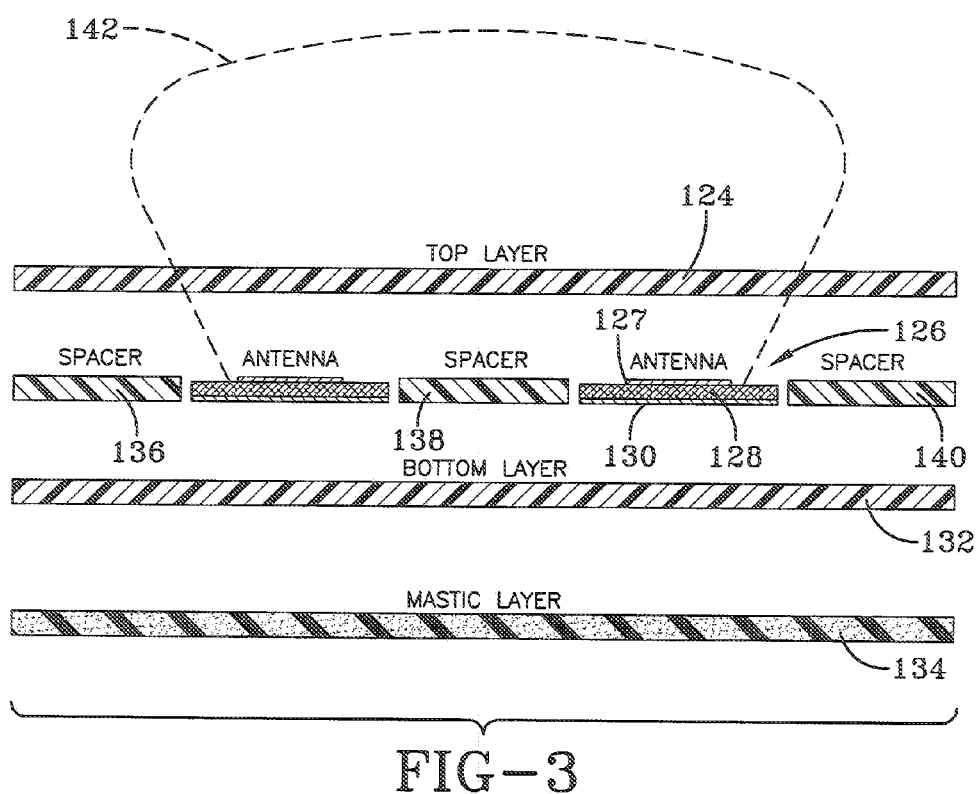
FIG. 3 is a cross-sectional view through the antenna device of FIG. 2.

Referring to FIGS. 2, 3, and 4, one or more relatively flat panel antenna devices 122 are deployed in the read station 100. The antenna device(s) 122 are of layered configuration preferably ranging in thickness from 0.5 to 1.0 inches. Each device 122 is structured having a top layer 124 formed of a material providing adequate antenna protection such as a thermoplastic material. Positioned below the top layer 124 is a loop antenna assembly 126. The loop antenna assembly 126 includes a conductive top plate 127 of relatively smaller width; a dielectric layer 128 positioned beneath the top plate 127; and a conductive plate 130 of wider dimension. The antenna assembly 126 is constructed functionally as a capacitor for creating an upwardly directed electromagnetic field 142. Situated adjacent to the antenna assembly 126 are spacer members 136, 138, 140 that maintain the gap between the top layer 124 and a bottom layer 132. The bottom layer is formed of a material providing a smooth upper surface and adequate protection for the antenna assembly 126. At the bottom of the antenna device 122 is a mastic layer 134 formed from mastic material suitable for filling in the low spots of the pad on which the assembly 122 is mounted.

An array of the antenna devices 122 may be situated within the station 100 in various configurations such as the representative configuration of FIG. 4. The antenna array contains multiple antenna devices 122 and connections therefore on a read station pad 144 in a predetermined spacing. The predetermined spacing operatively aligns an electromagnetic field from each antenna device 122 with a respective wheel unit transponder 102 when the wheel unit is positioned over or driven over the transponder. One antenna device 122 may be paired with each wheel unit transponder 102 or two or more antenna devices 122-A and 122-B may be positioned to align along the outer edges of a wheel unit 110 to operationally activate a respective antenna device 122 and receive identification data back from the device 122 as shown in FIG. 4. The field generated from a single antenna device or multiple antenna devices such as 122-A, 122-B operatively activate the wheel unit transponder 102 to initiate data transmission. Data from the wheel unit transponder(s) 102 are received by the antenna device(s) and relayed by connections 148 to an RF transceiver 154 connected at 252 to a data processing computer 150. A display 156 of information to a user is thereby facilitated.

Figure 6:
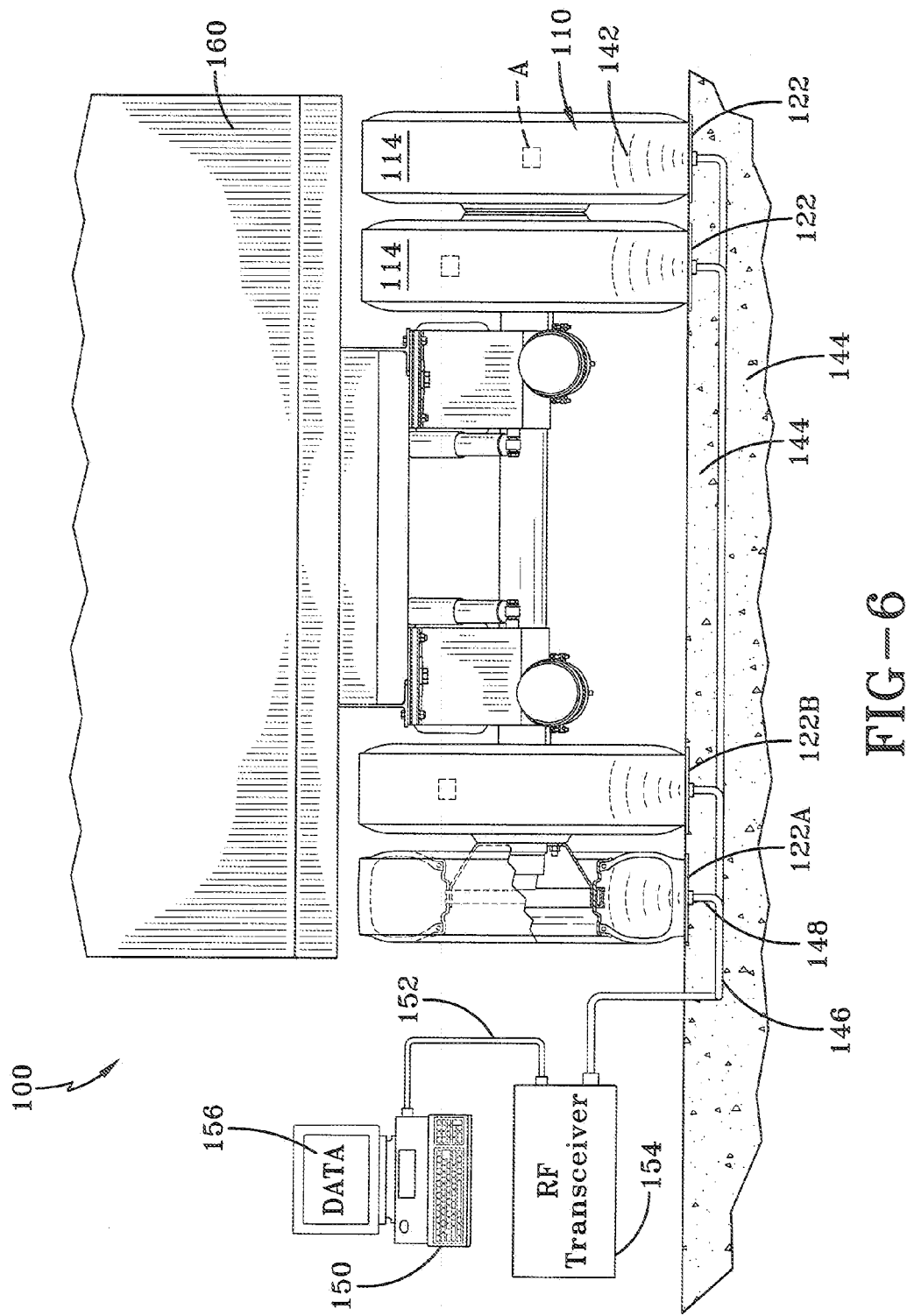
FIG. 6 is an end elevation view of a read station and tractor trailer in a read position within the station.
Figure 7:
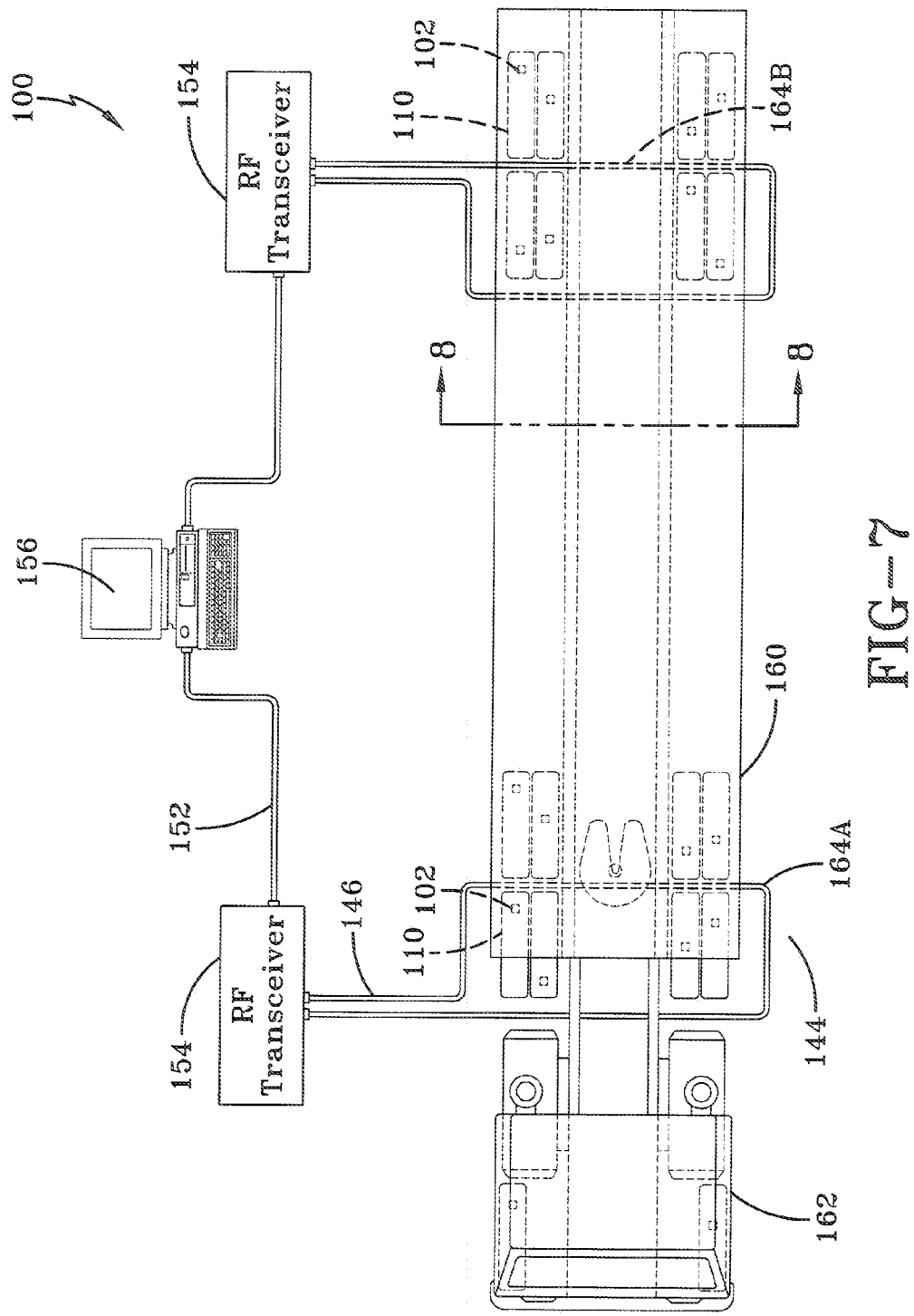
FIG. 7 is an alternatively laid out read station showing the position of the reader relative to a tractor trailer.

It will be appreciated that the read station 100 may be utilized in a commercial trucking operation to monitor and identify a tractor 162 and a trailer 160 as shown in FIGS. 6 and 7. The antenna device(s) 122 are mounted to the pad 144 in a flat orientation. Each device may be secured within a recess within the pad 144 or secured by adhesive or other appropriate means to an upper surface of the pad. The relatively low profile of the antenna device 122 minimizes clearance issues with the mud flaps of the tractor and/or trailer as the tractor trailer tandem moves across the pad 144. In addition, mounting the device(s) 122 to the pad protects the antenna devices 122 from potential damage from contact with outside objects located on or adjacent to the pad 144. Moreover, a drive over reading of the transponders 102 may be facilitated by location of the antenna device(s) below the tractor trailer tandem, whereby reducing the time required in reading the stored data within each transponder 102. Efficiency of operation is thereby enhanced.

It will further be appreciated from FIGS. 6 and 7 that mounting the antenna devices 122 on or embedded within the pad 144 allows the reader to couple a field to the transponder mounted to the inside mounted tire of a dual tire system. Adjacent antenna devices 122 may be positioned directly beneath respective tires as shown to generate respective fields operationally coupling with the transponder 102 of each wheel unit as the vehicle moves across the pad. The mastic layer 134 at the bottom of each antenna device 122 operates to fill in low spots on the pad 144 and maintain the device 122 at a level attitude. The sandwich configuration of the device 122 as described able protects the antenna and provides support. The cover layer 124 may be formed of a durable plastic material having a thinner sectional thickness than the bottom base layer 132. The cover layer 124 and base layer 132 are preferably formed from a low dielectric loss (transparent) material. The field 142 created by the device(s) 122 is established above the antenna device(s) 122 to couple with a respective transponder device 102 as the wheel unit rolls through the electric field.

As a wheel unit 110 rolls across the pad 144 the transponder 102 of each wheel unit 110 moves with its wheel unit toward and away from the pad. By exposing the transponder 102 of each wheel unit 110 to multiple fields from an array of devices 122 as the transponder 102 rotates across the pad with the wheel unit, the probability of achieving a close proximal coupling of the transponder 102 with an electric field is enhanced. The efficacy of transponder to field coupling ensures an accurate and expeditious activation of each transponder 102 and reading of data transmitted therefrom.

Figure 5:
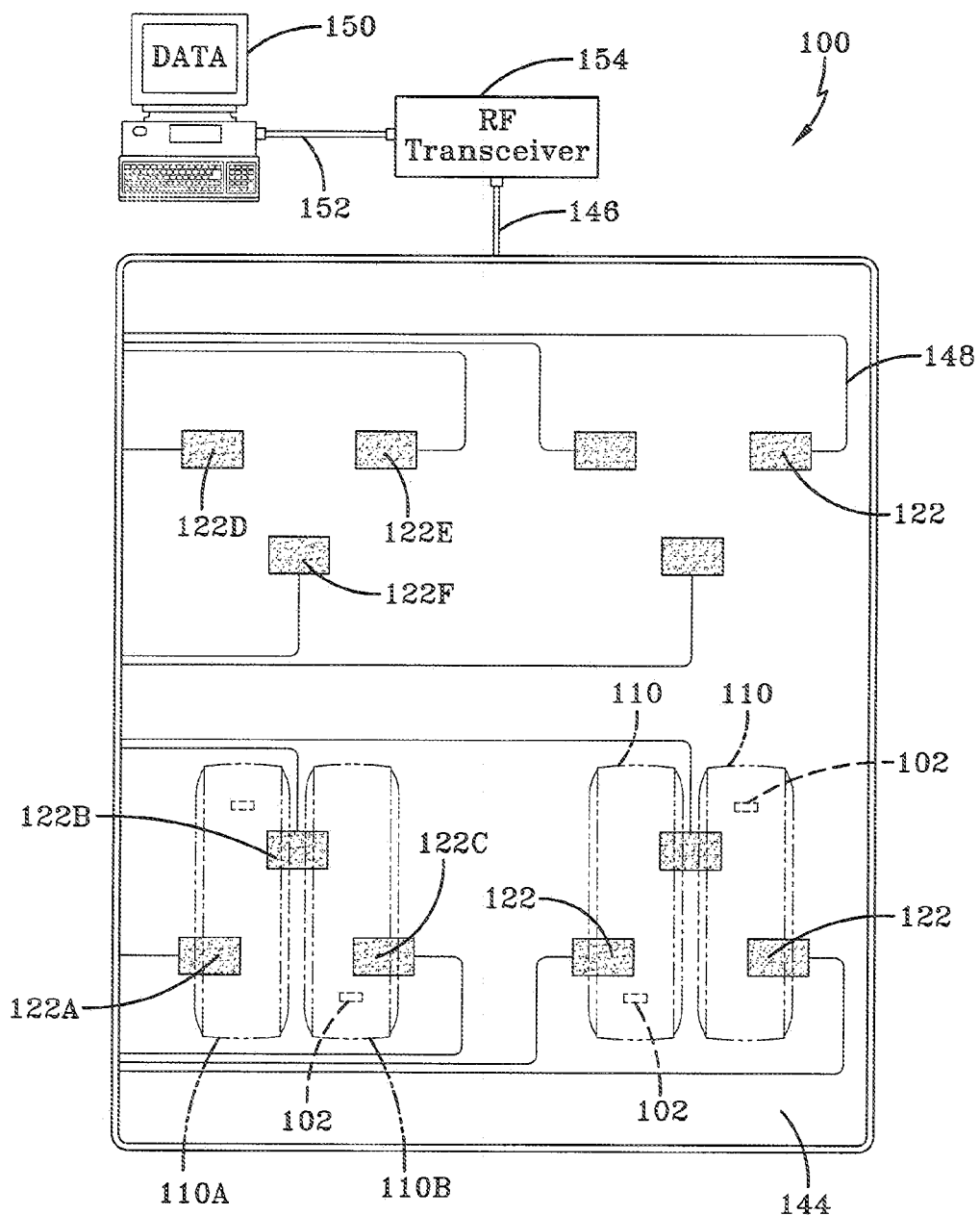
FIG. 5 is a schematic view of an alternative reader system.

FIG. 5 shows an alternative array in which a repeating grouping of three antenna devices 122A-C is positioned across the pad 144. The antenna devices 122 are connected by electrical line 146 to an RF transceiver 154. The transponder 102 in each wheel unit 110 is activated by the electric field generated by the RF transceiver 154 transmitted through the antenna devices. Each of the wheel unit transponders responds with a transmission of data back through the antenna devices to the RF transceiver 154. The triangular grouping of antenna devices 122A-C is positioned to create a field that may couple with a transponder 102 in a tandem pair of wheel units 110. It will be seen that the antenna devices 122A and 122C align with an outer edge of a respective wheel unit 110A and 110B. The antenna device 122B is positioned to align with inward edges of the tandem wheel unit pair with the vehicle in a read position on the pad 144. A second grouping of three antenna devices 122D-F align with the tandem wheel units 110A, 110B and as a backup to ensure a positive data download as the wheel units 110A, 110B roll across the pad 144.

Figure 8:
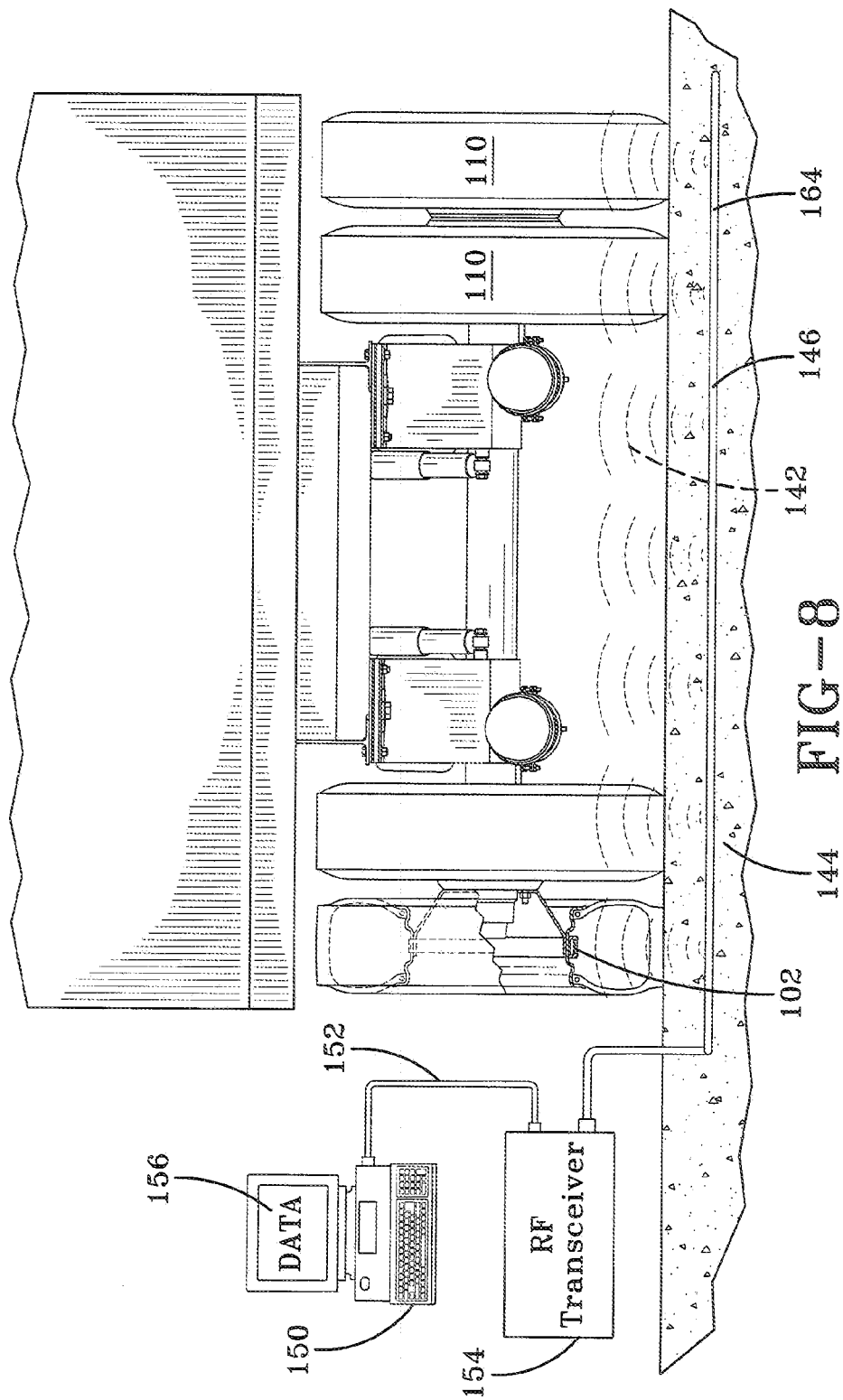
FIG. 8 is an end elevation view of an alternatively configured read station shown with a tractor trailer in a read orientation within the station.

Referring to FIG. 7 and FIG. 8, an alternative system is shown in schematic in which the activation field for forward and rearward transponders 102 of wheel units 110 are generated by forward and rearward loop antennae 164A, B. The loop antennae 164A, B are positioned at forward and rearward read locations on the pad 144 and are positioned to generate a respective electromagnetic field that couples with the four vehicle wheel units. The field empowers the transponders 102 in each of the coupled wheel units 110 to transmit data back through connection 152 to RF transceiver 154 and to a data processing computer 156. As the tractor 162 and trailer 160 move across the pad 144 the rearward set of four wheel units will enter the generated field created by the loop antennae 164A, B, resulting in a transponder empowering signal and data transmission back from the transponder(s) in similar fashion. The receipt of data from the transponder 102 of each wheel unit 110 is thus facilitated in an expeditious manner as the tractor and trailer move through the read station.

Figure 11:
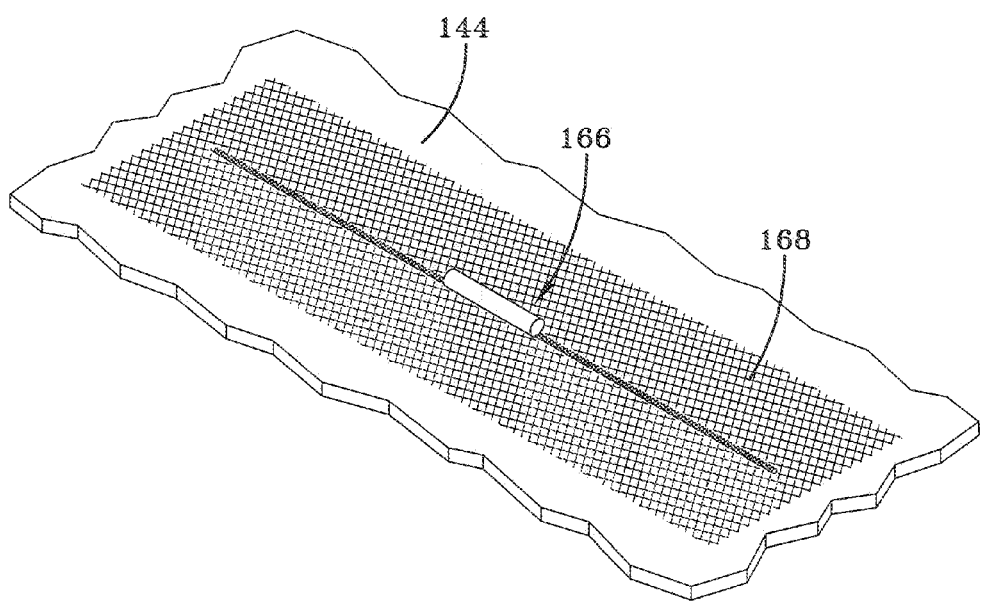
FIG. 11 is a side elevation of an alternative embodiment of an antenna device utilizing a dipole and reflective screen.

The generation of an electric field for the purpose of powering wheel unit transponders may be effected by the use of antennae of various configurations in addition to those described above. For example, without intent to delimit the invention, an array of dipole antennae of the type illustrated in FIG. 11 may be wired into the pad 144 in locations similar to those described above including the layered antenna as in FIGS. 2 and 3. The dipole antennas 166 may be arranged in pairs or used in a line formation to generate the field tuned to empower transponder devices in the wheel units 110. The dipoles 166 may be embedded a distance into the pad 144 sufficient to protect the dipoles from damage during use. The dipoles 166 may be positioned to read tags on middle sides of dual tires or all tags. For a pad constructed of concrete material, the relative static permittivity $\in_r$ is 5-10. Depending on the application, dipoles 166 may be embedded in linear formation or triangulated as described. As the vehicle proceeds across the pad 144 and over the embedded dipoles, the tags 100 in the wheel units will couple with one or more dipole fields at a time. Additionally, a reflective screen 168 may be positioned beneath the dipoles 166 within the concrete pad 144 to direct energy from the dipole upward to optimize electrostatic field strength at the wheel unit tag.

Figure 9:
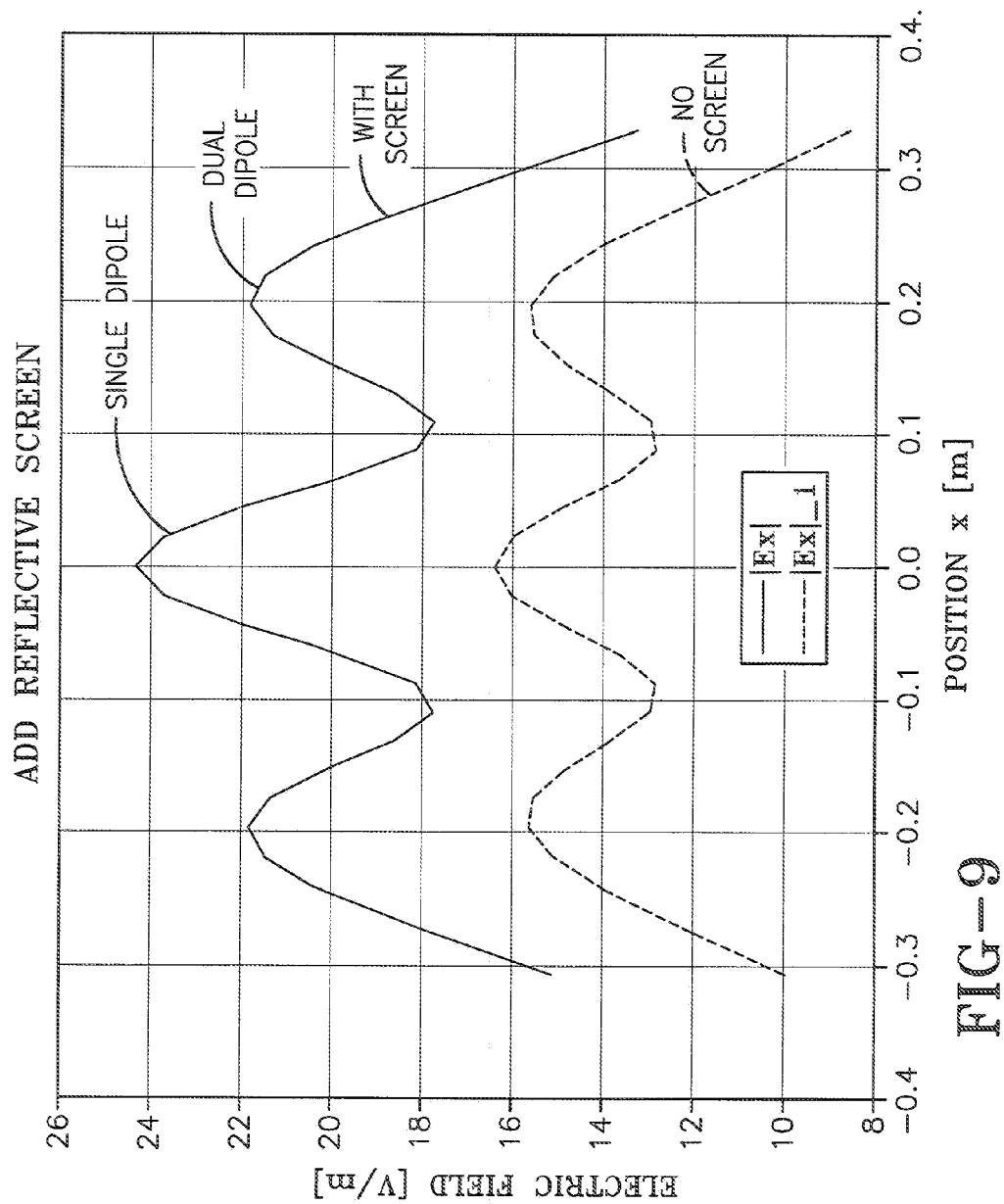
FIG. 9 is a graph of electric field strength at the transponder graphed against the distance between the antenna device and transponder device with a reflective screen in operation.
Figure 10:
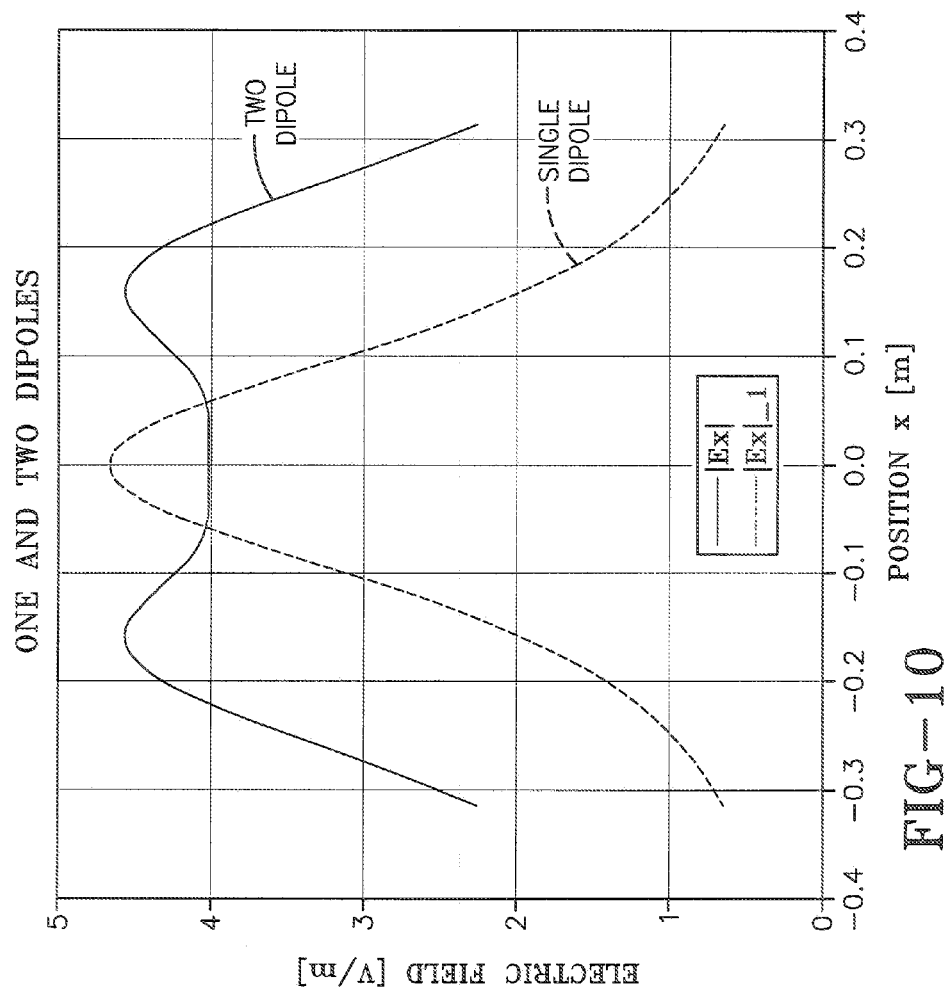
FIG. 10 is a graph of electric field strength at the transponder device from one and two dipole antenna systems graphed against the distance between the antenna device and the transponder device.

FIG. 10 depicts a graph of the E field at tag level, with a one volt drive. The graph plots electric field intensity at the tag level in a one dipole and a two dipole system. FIG. 9 is a graph at the tag level showing the effect of adding a reflective screen beneath one dipole and two dipole systems. The E field at the tag level is measured utilizing a 1 Watt drive. As shown, the addition of a screen below the dipole(s) beneficially intensifies the E-field at the tag level in both the single and double dipole systems.

With reference to FIGS. 3 and 6, it will be appreciated that the subject RFID reader reads the RFID tags 102 in a wheel unit 110 as a vehicle drives over a selected location on the pad 144. The pad 144 may be located in sundry locations where an identification of the wheel/tire, vehicle, and/or cargo is beneficial to the user. The read system may be used for logistics and fleet maintenance of commercial vehicles and can automatically log tires used in lease and maintenance contract locations. The antenna devices 122, in the form shown in FIG. 3 or in other antenna configurations such as, but not limited to, the dipole antenna of FIG. 11, may be buried in the concrete or other material composing the pad 144. In line arrays or antenna devices 122 or other configurations may be disposed in a preferred orientation across the pad 144 to ensure that a positive reading of the RFID tag 102 by the time the vehicle departs from the pad 144. The embedding of antenna devices within the pad 144 avoids contact with moving obstructions such as the vehicle or mudflaps of the vehicle. Moreover, such positioning of the antenna devices 122 within the pad 144 allows suitable location of the devices to read tags of both tires in a dual tire system.

The antenna device 122 of FIG. 3 utilizes spacers 136, 138, and 140 to structurally reinforce the layered configuration of the device from damage from the vehicle tire rolling over the device. In addition, the spacers 136, 138, 140 and the cover layer 124 and bottom layer 132 may be composed of a material such as a plastic having a static permittivity less than the dielectric layer 128 of the antenna device so as to concentrate energy out of the device 122. Addition of a reflective screen may further be utilized to concentrate the static electric field toward the RFID transponder in the wheel unit in a single or double dipole antenna system as explained previously.

From the foregoing, it will be understood that multiple antenna devices may be configured in an in-line array and connected to one or multiple electric field generators. The array aligns with the wheel-based RFID tags of the vehicle and operatively couples a plurality of in-line electric fields with the RFID tag(s) as the vehicle moves over and departs from the pad. The RFID tags may be rim or tire mounted to rotate with the wheel unit. The in-line array of antennae have a spacing operative to proximally and sequentially couple with the RFID tags as the wheel unit(s) roll across the pad.

One or more secondary above-ground antenna device(s) (not shown) may be employed if desired in conjunction with the drive-over embedded antennae, each coupled to an electric field generating transmitter device and located to operatively subject the vehicle wheel-mounted RFID tags to a secondary electric field as the vehicle moves across the pad.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A reader system for a wheel-based, electric field-actuated transponder device of the type having a transmitter for transmitting data from a vehicle to an external receiver, the reader system comprising:
    a support pad for operatively supporting and positioning the vehicle in at least one read location on an upper pad surface;
    at least one antenna device on the support pad located to operatively align with the vehicle wheel-mounted transponder device with the vehicle on the support pad in the one read location;
    at least one transmitter device and receiver device coupled to the antenna device for generating an upwardly directed electric field to actuate the transponder device and receive a responsive signal back from the transponder device; and
    wherein further comprising at least one secondary above-ground antenna device coupled to an electric field generating transmitter device and located to operatively subject the vehicle wheel-mounted transponder device to a secondary electric field with the vehicle in the one read location.

2. The reader system of claim 1, wherein the one antenna device and the secondary above-ground antenna device are proximally located to simultaneously subject the vehicle wheel-mounted transponder device to respective electric fields with the vehicle in the one read location.

3. A reader system for a wheel-based, electric field-actuated transponder device of the type having a transmitter for transmitting data from a vehicle to an external receiver, the reader system comprising:
    a support pad for operatively supporting and positioning the vehicle in at least one read location on an upper pad surface;
    at least one antenna device on the support pad located to operatively align with the vehicle wheel-mounted transponder device with the vehicle on the support pad in the one read location;
    at least one transmitter device and receiver device coupled to the antenna device for generating an upwardly directed electric field to actuate the transponder device and receive a responsive signal back from the transponder device; and
    wherein the one antenna device comprises: a base layer; a conductive antenna member positioned on the base layer; and a cover layer over the antenna member.

4. The reader system of claim 3, wherein further comprising a spacer member situated between the base layer and the cover layer.

5. The reader system of claim 3, wherein the antenna member comprises a conductive top and bottom plates and a dielectric material layer situated between the top and bottom plates.

6. The reader system of claim 5, wherein the cover layer and the base layer are composed of respective materials having a respective relative static permittivity less than the relative static permittivity of the dielectric material layer.

7. The reader system of claim 3, wherein the cover layer and the base layer are at least partially composed of thermoplastic material.

8. The reader system of claim 3, wherein further comprising a mastic layer below the base layer for affixing the antenna device to the support pad upper pad surface.

9. A reader system for a wheel-based, electric field-actuated transponder device of the type having a transmitter for transmitting data from a vehicle to an external receiver, the reader system comprising:
    a support pad for operatively supporting and positioning the vehicle in at least one read location on an upper pad surface;
    at least one antenna device on the support pad located to operatively align with the vehicle wheel-mounted transponder device with the vehicle on the support pad in the one read location;
    at least one transmitter device and receiver device coupled to the antenna device for generating an upwardly directed electric field to actuate the transponder device and receive a responsive signal back from the transponder device;
    wherein the antenna device comprises at least one dipole antenna embedded within and covered by the support pad; and
    wherein further comprising a reflective member situated beneath the one dipole antenna for operatively directing energy upward from the one dipole antenna.

10. A reader system for a wheel-based, electric field-actuated transponder device of the type having a transmitter for transmitting data from a vehicle to an external receiver, the reader system comprising:
- a support pad for operatively supporting and positioning the vehicle in at least one read location on an upper pad surface;
- at least one antenna device on the support pad located to operatively align with the vehicle wheel-mounted transponder device with the vehicle on the support pad in the one read location;
- at least one transmitter device and receiver device coupled to the antenna device for generating an upwardly directed electric field to actuate the transponder device and receive a responsive signal back from the transponder device; and
- wherein further comprising a reflective member situated beneath the antenna device for directing energy upward from the antenna device.

11. A reader system for a wheel-based, electric field-actuated transponder device of the type having a transmitter for transmitting data from a vehicle to an external receiver, the reader system comprising:
- a support pad for operatively supporting and positioning the vehicle in at least one read location on an upper pad surface;
- at least one antenna device on the support pad located to operatively align with the vehicle wheel-mounted transponder device with the vehicle on the support pad in the one read location;
- at least one transmitter device and receiver device coupled to the antenna device for generating an upwardly directed electric field to actuate the transponder device and receive a responsive signal back from the transponder device;
- wherein the antenna device is aligned to operatively underlie the vehicle wheel-mounted transponder device with the vehicle on the support pad in the one read location; and
- wherein the antenna device comprises a layered assembly having a thickness in the range of 0.5 to 1.0 inches.

12. The reader system of claim 11, layered assembly comprises a top protective layer of substantially flat configuration; a loop antenna assembly underlying the top layer; and a bottom layer having a substantially smooth upper surface.

13. The reader system of claim 12, wherein the layered assembly further comprises a mastic layer underlying the bottom layer.

14. The reader system of claim 12, wherein the loop antenna assembly comprises a conductive top plate of relatively smaller width; a dielectric layer positioned beneath the top plate; a conductive plate of wider dimension than the top plate underlying the dielectric layer.

15. The reader system of claim 14, wherein a plurality of antenna devices are positioned to underlie a vehicle wheel with the vehicle on the support pad in the one read location.

16. The reader system of claim 15, wherein the plurality of antenna devices are spaced apart and positioned to align along the outer edges of a wheel unit of the vehicle unit with the vehicle on the support pad in the one read location.

17. The reader system of claim 11, wherein the antenna device resides within a recess within the support pad.

18. The reader system of claim 11, wherein the antenna device comprises a layered assembly comprising: a top protective layer of substantially flat configuration; a loop antenna assembly underlying the top layer, the loop antenna assembly including a conductive top plate of relatively smaller width; a dielectric layer positioned beneath the top plate; and a conductive plate of wider dimension than the top plate underlying the dielectric layer; and the layered assembly further comprising a bottom layer underlying the loop antenna assembly.

* * * * *